United States Patent [19]
Rule et al.

[11] Patent Number: 5,100,255
[45] Date of Patent: Mar. 31, 1992

[54] GRAPHITE FITTINGS FOR GRAPHITE TUBING

[75] Inventors: Scott L. Rule; Tracey B. Loyd, both of Wichita; David C. Hamilton, Oxford; Carl A. Lunnam, Augusta, Kans.

[73] Assignee: The Boeing Company, Seattle, Wash.

[21] Appl. No.: 450,266

[22] Filed: Dec. 13, 1989

[51] Int. Cl.[5] .............................................. F16B 1/00
[52] U.S. Cl. .................................. 403/205; 403/267; 403/403
[58] Field of Search ................ 403/403, 205, 267, 266

[56] References Cited

U.S. PATENT DOCUMENTS

| | | | |
|---|---|---|---|
| 3,392,947 | 7/1968 | Keliehor | 248/188 |
| 4,234,650 | 11/1980 | Schieber | 428/280 |
| 4,279,952 | 7/1981 | Kodama et al. | 428/36 |
| 4,379,798 | 4/1983 | Palmer | 428/113 |
| 4,384,802 | 5/1983 | Lo et al. | 403/403 X |
| 4,450,971 | 5/1984 | Kashiwabara | 403/161 X |
| 4,654,242 | 3/1987 | Schieber | 428/36 |
| 4,786,343 | 11/1988 | Hertzberg | 156/93 |

FOREIGN PATENT DOCUMENTS 2126682  3/1984  United Kingdom ............... 403/205

Primary Examiner—Andrew V. Kundrat
Attorney, Agent, or Firm—Kenneth J. Cooper

[57] ABSTRACT

An apparatus for joining lengths of tubing to form tooling structures for high temperature and high pressure molding processes. The apparatus is shaped to join lengths of tubing in the configuration of the tooling structure, contact the joined lengths of tubing on at least one side, and enclose on three sides the joined lengths of tubing.

8 Claims, 5 Drawing Sheets

GRAPHITE FITTINGS FOR GRAPHITE TUBING

BACKGROUND OF THE INVENTION

1. Field of The Invention

The present invention relates to graphite fittings for graphite tubing.

2. Description of The Related Art

Various materials and construction techniques have been combined to build tooling structures. Some structures use an aluminum honeycomb sandwiched between laminated board materials. This type of sandwich laminate board is utilized in an egg crating structure configuration to support a tooling/molding surface. Ventilation in this egg crating structure is a requirement for proper air circulation during the cure cycle heat up and cool-down. Ventilation in the egg crating structure occurs with holes through the sandwich laminate board. Tooling structures are also built of welded aluminum members, but the metal's response to temperature and pressure hinders accurate molding of products. A third tooling structure material is preimpregnated woven material formed into lengths of tubing. This tubing typically is square with two or four inch sides. These tubes are joined at various angles by fittings made of laminated board.

The above building materials for tooling structures have shortcomings. The aluminum honeycomb-laminated board combination is expensive, cumbersome, and labor intensive. Much effort goes into joining the honeycomb and the laminated board. Once joined, the tooling structure must be analyzed to determine where and how large ventilation holes will be cut in the structure.

The welded aluminum structure requires extensive skilled labor for welding the aluminum members to the designed shape. Once completed, the welded structure's large weight is a shortcoming.

The preimpregnated woven structural tubing overcomes many of the above shortcomings. The tubing is easily cut to required lengths, is light weight, and responds to temperature and pressure compatibly with parts molded on the graphite tooling structure. One drawback, however, to preimpregnated woven structural tubing has been the laminated board fittings used to join the graphite tubing in the designed tooling structure shape. These fittings responded to temperature and pressure differently than the tubing. Consequently, molded part production was unpredictable and uniformity in the parts impossible.

The present invention overcomes the problem arising from using a laminated board fitting with a graphite tubing tooling structure. The invention uses preimpregnated graphite woven material to preform standard fittings used in tooling structure construction. These fittings are rectangularly shaped but have only three sides. The fourth side is left open to speed tooling structure assembly and accommodate minor variations in tubing dimensions. Graphite tubing is inserted in the graphite fitting and held in place by drilling a hole through the fitting and graphite tubing and inserting a fastener, such as a nut and bolt combination or a blind fastener.

U.S. Pat. No. 3,392,947 and United Kingdom patent number GB 2 126 682 A disclose joining components for furniture. U.S. Pat. No. 3,392,947 describes rectangular structural members with tenons and mortises at joining points. GB 2 126 682 A describes furniture joints made of flat chip board panels. This furniture art is not particularly relevant to the graphite tooling structures built with the applicant s invention.

U.S. Pat. No. 4,379,798 discloses structural components formed of resin impregnated graphite webbing. The patent includes no suggestion for forming fittings of this resin impregnated fabric or for interconnecting structural components made of the resin impregnated fabric.

The present invention offers builders cf tooling structures lightweight, strong, versatile fittings which react compatibly with molded products under high temperatures and pressures.

Additional features, advantages and characteristics of the invention will become apparent from a reading of the following description or may be learned by practice of the invention.

SUMMARY OF THE INVENTION

The invention which achieves the above identified advantages is an apparatus for joining lengths of tubing together to form tooling structures for high temperature and high pressure molding processes. The apparatus is a fitting which is shaped to join lengths of tubing in the configuration of the tooling structure, contact the joined lengths of tubing on at least one side, and enclose on three sides the joined lengths of tubing.

BRIEF DESCRIPTION OF THE DRAWINGS

The accompanying drawings, incorporated in and constituting a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

Figure 1:
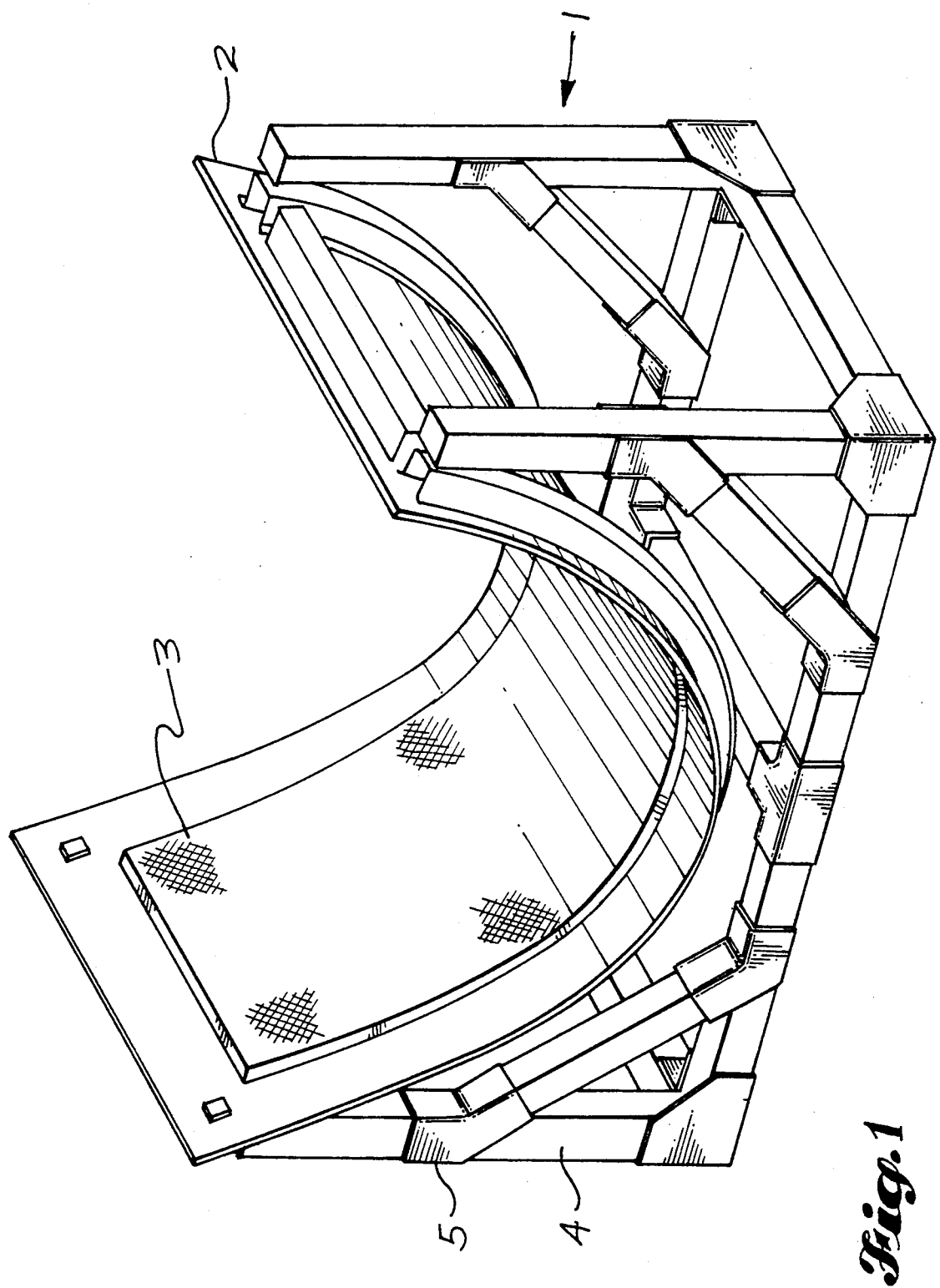
FIG. 1 is an isometric view of a tooling structure.

Tooling structures 1 (FIG. 1) are used to build contoured support 2 for a molded item 3. The molded item 3 becomes rigidly shaped when the tooling structure 1 containing the item 3 is subjected to high temperature and high pressure in an autoclave. Such production conditions and requirements, before the development of the invention, produced inconsistent molded items 3 because the material used for the molded item 3 and the tooling structure 1 expanded and contracted at different rates and amounts responsive to the same temperature and pressure. The invention allows the tooling structure 1 to be made of the same material as molded item 3 so temperature and pressure related expansion and contraction responses are similar for tooling structure 1 and molded item 3. The result is molded items 3 are more accurately produced.

Figure 2:
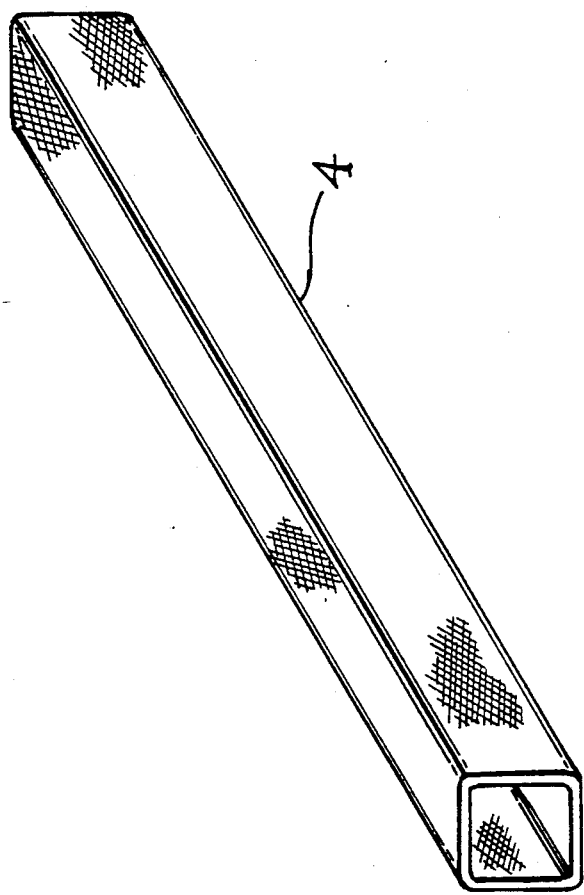
FIG. 2 is an isometric view of tubing used to build tooling structures represented in FIG. 1.
Figure 3:
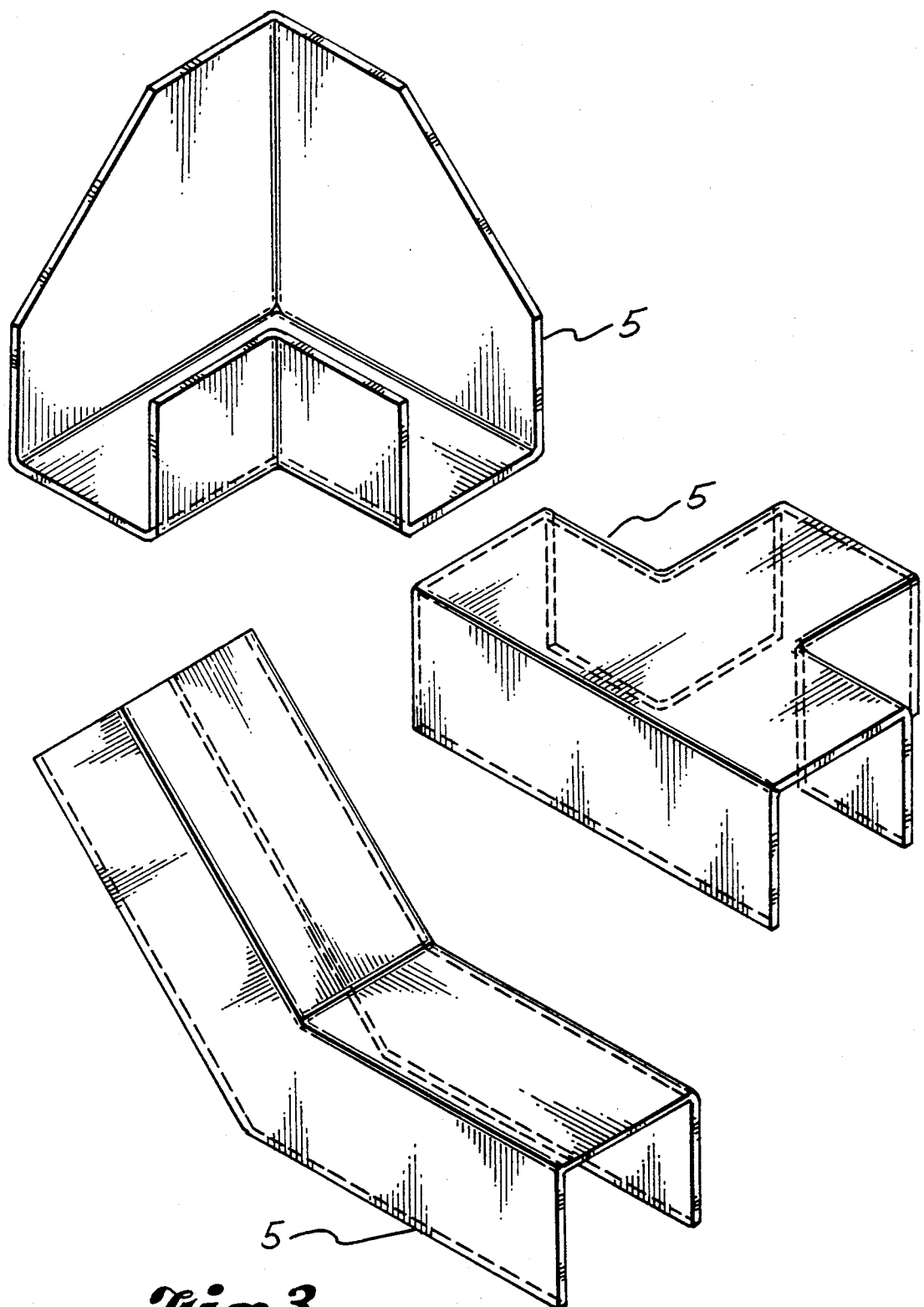
FIG. 3 depicts several fittings for joining the tubing represented in FIG. 1.

Tooling structure 1 is built with lengths of tubing 4 (FIG. 2). The tubing 4 is typically squarely shaped with equal side lengths of two inches or four inches. Various lengths of tubing 4 are joined together by means of the present invention, preformed fittings 5 (FIG. 3). The fittings 5 are generally square shaped with sides slightly longer than two inches or four inches so the correspondingly sized tubing 4 (FIG. 4) fits inside fitting 5.

Figure 4:
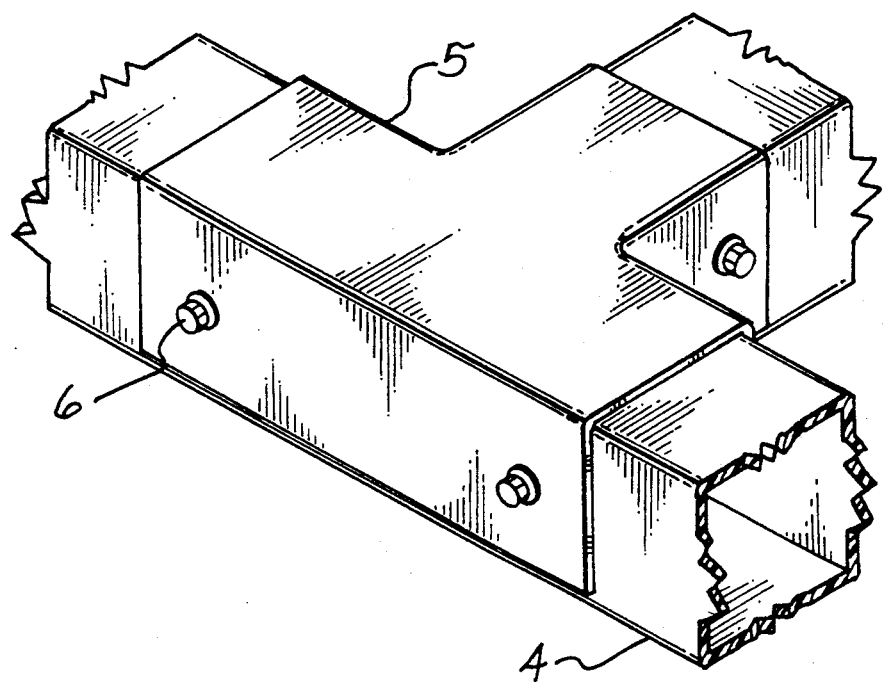
FIG. 4 depicts a fitting from FIG. 3 joining lengths of tubing depicted in FIG. 1.

Fittings 5 (FIG. 3) are preformed to a variety of standard angles and configurations. The fittings 5, though generally square shaped, have only three sides. This open side accommodates minor size variations among tubing 4 (FIG. 4). The three sided, multiple configurations of fittings 5 (FIG. 4) decrease the time needed to build tooling structures 1 (FIG. 1). Tubing 4 (FIG. 4) easily slides into fitting 5 to configure the needed tooling structure 1 (FIG. 1). The tubing 4 (FIG. 4) may be secured in fitting 5 by drilling a hole through fitting 5 and tubing 4 and inserting a fastening device 6, such as a nut and bolt combination or a blind fastener.

Figure 5:
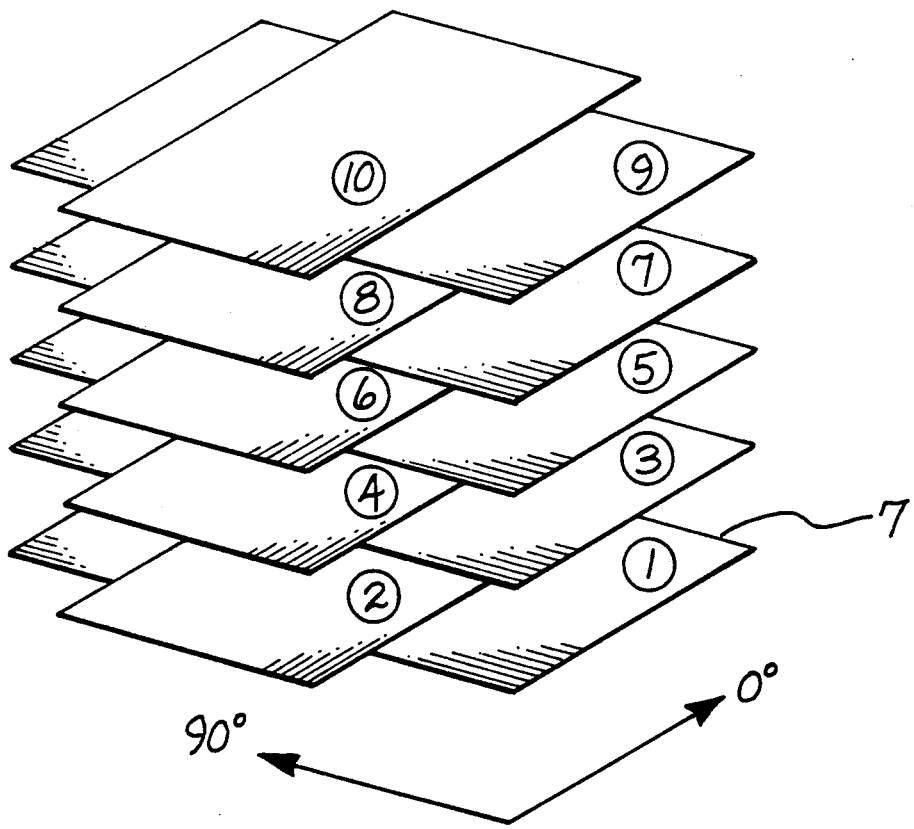
FIG. 5 is an expanded view of the layered, resin impregnated, woven graphite fabric used to form the invention.
Figure 6:
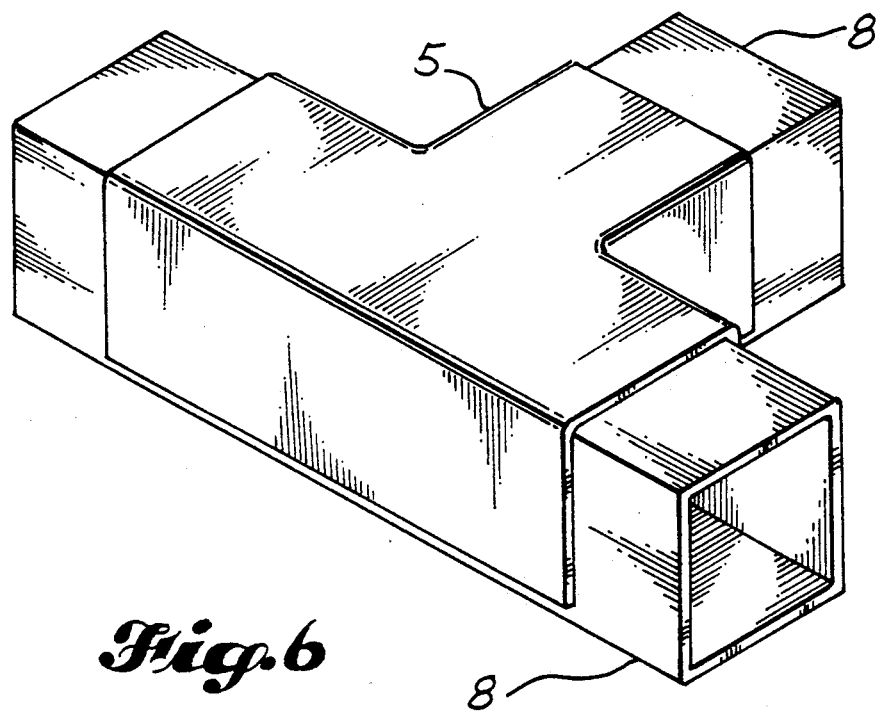
FIG. 6 depicts a mold for forming one cf the fittings shown in FIG. 3.

Fitting 5 (FIG. 3) may be formed using multiple layers of woven graphite fabric 7 (FIG. 5) having preimpregnated resin. Approximately ten to twelve plies of the woven graphite fabric 7 are alternately layered at 90° angles when making fittings 5 (FIG. 3). The layered plies of graphite fabric 7 (FIG. 5) are then laid over a form 8 (FIG. 6) having the desired fitting shape. The form 8 and plies of graphite fabric 7 are then placed in an autoclave, subjected to heat and pressure over time, removed from the autoclave then returned to the autoclave without the form 8 for additional heat and pressure exposure to set the shape of the layered graphite fabric 7. The resulting fitting 5 (FIG. 3) is then trimmed for use in building tooling structures 1 (FIG. 1).

Various changes, modifications and alternatives will become apparent after a reading of the foregoing application. It is intended that all such changes, modifications and alternatives as come within the scope of the appended claims be considered part of the present inventions.

What is claimed is:

1. A fitting for connecting together lengths of rectangular cross-section resin impregnated synthetic fiber reinforced tubing to form a tooling structure for supporting a mold on which resin impregnated synthetic fiber reinforced parts are laid up and cured in an autoclave, comprising:
   a resin impregnated synthetic fiber reinforced channel structure having a floor and upstanding walls extending from said floor at right angles thereto to provide an open-topped structure into which a plurality of rectangular cross-section resin impregnated synthetic fiber reinforced tubes can be fit between said walls and in contact with said floor, and secured with a fastener through said walls and into said tubing;
   whereby said fitting can join resin impregnated synthetic fiber reinforced rectangular cross-section tubing to form a rigid tooling structure having the same coefficient of thermal expansion as said tooling and said resin impregnated synthetic fiber reinforced parts.

2. The apparatus of claim 1, wherein the fitting is shaped to predetermined joint configurations for reuse in joining lengths of tubing.

3. The apparatus of claim 1, wherein the fitting contacts the joined lengths of tubing on at least one outside tubing surface where the fitting and tubing are bonded or mechanically fastened together.

4. A tooling structure for supporting a mold on which resin impregnated synthetic fiber reinforced parts are laid up and cured in an autoclave, comprising:
   a plurality of fittings for connecting lengths of rectangular cross-section resin impregnated synthetic fiber reinforced tubing together, each of said fittings including a resin impregnated synthetic fiber reinforced channel structure having a floor and upstanding walls extending from said floor at right angles thereto to provide an open-topped structure;
   a plurality of rectangular cross-section resin impregnated synthetic fiber reinforced tubes lying within and between said depending walls of said channel structure and in contact with said floor, and secured with a fastener through said walls and into said tubing;
   whereby said fitting joins said resin impregnated synthetic fiber reinforced rectangular cross-section tubes to form a rigid tooling structure having the same coefficient of thermal expansion as said tooling and said resin impregnated synthetic fiber reinforced parts.

5. The apparatus of claim 4, wherein the fitting contacts the joined lengths of tubing on at least one outside surface where the fitting and tubing are bonded or mechanically fastened together.

6. The apparatus of claim 4, wherein the fitting is shaped to predetermined joint configurations for reuse in joining lengths of tubing.

7. A method of joining lengths of tubing to construct tooling assemblies comprising:
   forming fittings to join lengths of tubing into the tooling assembly by layering multiple plies of woven graphite fabric, preimpregnated with resin, over a form, and exposing the layers of multiple plies of woven graphite fabric over the form to heat and pressure to set the fabric into the shape of the form;
   contacting at least one side of the joined length of tubing with the fitting; and
   enclosing with the fitting three sides of the lengths of tubing to be joined.

8. The method of claim 7, wherein forming fittings to join lengths of tubing into the tooling assembly comprises shaping the fitting to predetermined joint configurations for reuse in joining lengths of tubing.

* * * * *